United States Patent

Gerber et al.

(10) Patent No.: US 8,576,968 B2
(45) Date of Patent: Nov. 5, 2013

(54) TCP FLOW CLOCK EXTRACTION

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Walter Willinger, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1044 days.

(21) Appl. No.: 12/575,850

(22) Filed: Oct. 8, 2009

(65) Prior Publication Data

US 2011/0085630 A1    Apr. 14, 2011

(51) Int. Cl.
*H04L 7/02* (2006.01)

(52) U.S. Cl.
USPC ...... 375/359; 375/354; 370/395.52; 370/912; 370/913

(58) Field of Classification Search
USPC .............. 375/359, 354; 370/395.52, 912, 913
See application file for complete search history.

(56) References Cited

U.S. PATENT DOCUMENTS

2009/0187653 A1* 7/2009 Fu et al. ........................ 709/224

\* cited by examiner

*Primary Examiner* — Leila Malek
(74) *Attorney, Agent, or Firm* — Hartman & Citrin LLC

(57) ABSTRACT

A packet trace is received. The packet trace is transformed into a sequence of pulse signals in a temporal domain. The sequence of pulse signals in the temporal domain is transformed into a sequence of pulse signals in a frequency domain. Peaks are detected within relevant frequency bands in the sequence of pulse signals in the frequency domain. A fundamental frequency is identified within the peaks. The fundamental frequency, which represents the TCP flow clock, is returned.

20 Claims, 3 Drawing Sheets

TCP FLOW CLOCK EXTRACTION

BACKGROUND

This application relates generally to the field of computer networks. More specifically, the disclosure provided herein relates to extracting a Transmission Control Protocol ("TCP") flow clock.

Modern Internet Protocol ("IP") networks carry traffic from a diverse set of applications, ranging from non-real-time applications to real-time applications. Generally, real-time applications are those applications that meet a real-time constraint, i.e., a time limit in which a system responds to a request or event. Examples of non-real-time applications include email and bulk data transfers (e.g., File Transfer Protocol ("FTP") file transfers). Examples of real-time applications include Voice over IP ("VoIP"), Internet Protocol Television ("IPTV"), Internet games, and critical business transactions.

Historically, non-real-time applications dominated the Internet landscape. However, in recent years, real-time applications have become increasingly popular. A number of factors have contributed to this material shift from non-real-time applications to real-time applications. These factors include the rapid deployment of backbone links with one to two orders of magnitude more network capacity, the increasing reach of broadband access networks, the emergence of bandwidth-intensive streaming applications, and an economic and technological move towards transitioning even mission-critical applications from dedicated networks to the Internet through architectures like Virtual Private Networks ("VPNs").

While the applications, as well as the constraints upon which the applications operate, have multiplied, TCP has remained the dominant transport layer protocol in IP networks. In particular, TCP is widely adopted by many new applications and accounts for the majority of current traffic on the Internet. However, TCP was originally designed to support a reliable, in-order delivery of a byte stream between two endpoints in a bandwidth friendly manner. In this regard, TCP is not an ideal transport protocol for real-time applications.

A number of considerations have contributed to the dominance of TCP in IP networks. These considerations include the following: (1) TCP is deployed nearly ubiquitously; (2) TCP helps offload many low-level transport details with which an application developer would otherwise have to contend; and (3) TCP packets are routinely allowed by firewalls, which typically block non-TCP data flows. Further, fueled by the need to support more stringent performance requirements of emerging applications, developers have created various TCP variants, such as FAST, HSTCP, and CUBIC. Some vendors have also promoted acceleration hardware that offers propriety optimizations to TCP.

While TCP continues to dominate IP networks, little is known or studied about the behavior of TCP traffic on the Internet. Understanding the behavior of TCP may be vital for proper management, provisioning, and capacity planning of IP networks. Further, understanding the behavior of TCP may provide insights to guide network protocol design.

SUMMARY

Embodiments of the disclosure presented herein include methods, systems, and computer-readable media for extracting a TCP flow clock. According to one aspect, a method for extracting the TCP flow clock is provided. According to the method, a packet trace is received. The packet trace is transformed into a sequence of pulse signals in a temporal domain. The sequence of pulse signals in the temporal domain is transformed into a sequence of pulse signals in a frequency domain. Peaks are detected within relevant frequency bands in the sequence of pulse signals in the frequency domain. A fundamental frequency is identified within the peaks. The fundamental frequency, which represents the TCP flow clock, is returned.

According to another aspect, a system for extracting the TCP flow clock is provided. The system includes a memory and a processor functionally coupled to the memory. The memory stores a program containing code for extracting the TCP flow clock. The processor is responsive to computer-executable instructions contained in the program and configured to perform the following operations. A packet trace is received. The packet trace is transformed into a sequence of pulse signals in a temporal domain. The sequence of pulse signals in the temporal domain is transformed into a sequence of pulse signals in a frequency domain. Peaks are detected within relevant frequency bands in the sequence of pulse signals in the frequency domain. A fundamental frequency is identified within the peaks. The fundamental frequency, which represents the TCP flow clock, is returned.

According to yet another aspect, a computer-readable medium having instructions stored thereon for execution by a processor to perform a method for extracting the TCP flow clock is provided. According to the method, a packet trace is received. The packet trace is transformed into a sequence of pulse signals in a temporal domain. The sequence of pulse signals in the temporal domain is transformed into a sequence of pulse signals in a frequency domain. Peaks are detected within relevant frequency bands in the sequence of pulse signals in the frequency domain. A fundamental frequency is identified within the peaks. The fundamental frequency, which represents the TCP flow clock, is returned.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
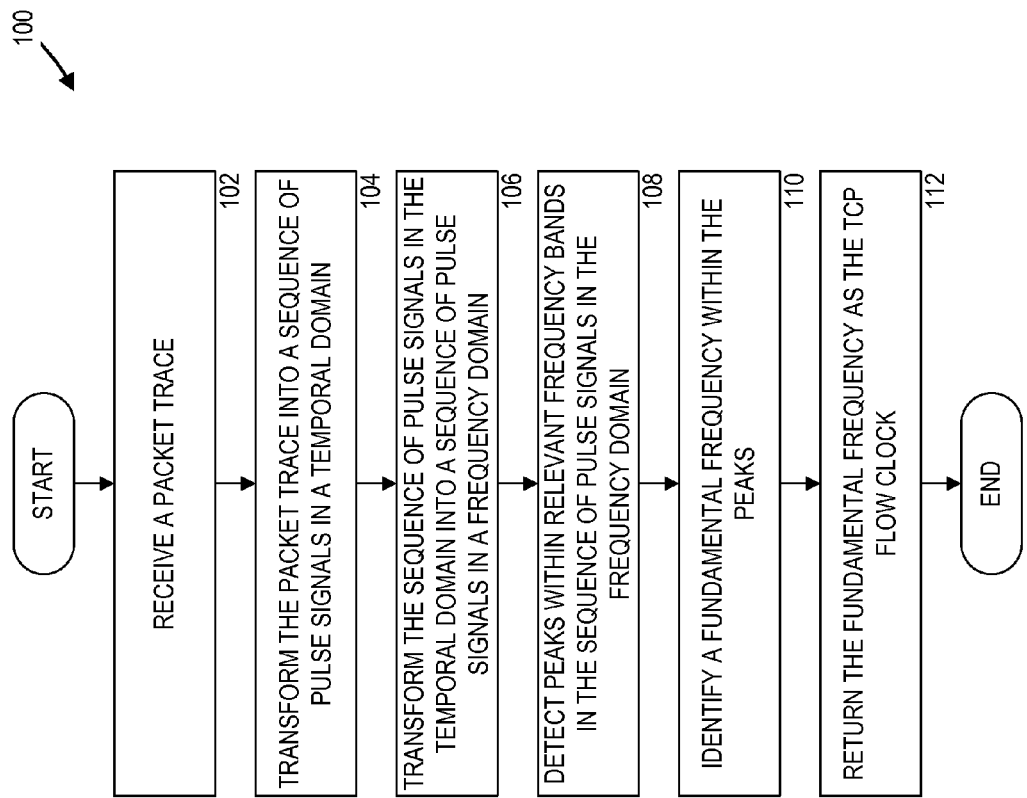
FIG. 1 is a flow diagram illustrating an exemplary method for extracting a TCP flow clock, in accordance with some embodiments.

The following detailed description is directed to methods, systems, and computer-readable media for extracting a TCP flow clock. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. As used herein, a TCP flow clock refers to regular time intervals between data packets transmitted over TCP. The transmission of data packets over TCP may be referred to as TCP flow. It is commonly accepted that the TCP flow clock may be caused by round trip time ("RTT") of the data packets, and thus, may be inherently linked to the transport layer. However, the TCP flow clock can originate from other layers within the Internet Protocol Suite ("TCP/IP"). Through embodiments described herein, a computing system and methodology are provided for accurately extracting the TCP flow clock from unidirectional packet traces. By analyzing the TCP flow clock with respect to the TCP flow, it can be determined that the TCP flow clock may originate from the application layer and/or the link layer.

Understanding the different root causes for TCP flow clocks may have a number of potentially far reaching implications. First, by validating that the TCP flow clock is not necessarily generated by the transport layer, conventional algorithms that explicitly associate RTT with flow clock become provably inaccurate. Second, the TCP flow clock may be utilized as a new feature for traffic classification, application performance monitoring, and network anomaly detection. In one example, different real-time (e.g. streaming) applications can be identified as some of these real-time applications use different rates and intervals for transmitting packet trains. In particular, the different rates and intervals may be reflected in the flow clock. Thus, in this context, the flow clock becomes one more (not necessarily the only one) parameter used to identify particular applications. In another example, a regular flow clock of a real-time application may be an indication of good application performance. In particular, if retransmissions are required, the flow clock may be less regular. In yet another example, if irregular flow clocks in multiple real-time flows are discovered, then the discovery of irregular flow clocks may be used to identify network anomalies on elements common to those flows.

Referring now to the drawings, in which like numerals represent like elements through the several figures, FIG. 1 is a flow diagram illustrating an exemplary method 100 for extracting a TCP flow clock, where it exists, according to some embodiments. The method 100 is a high-level overview, and additional details are provided below with respect to FIG. 2. The method 100 begins at operation 102, a packet trace is received. As used herein, a packet trace refers to a collection of packets exchanged between two communicating entities, such as routers. In one embodiment, the packet trace is a unidirectional packet trace (i.e., only packets from a sending entity to a receiving entity but not from the receiving entity to the sending entity). The packet trace may be collected directly from the communicating entities or via another suitable source. The method 100 then proceeds to operation 104, where a packet trace is viewed as a sequence of pulse signals in a temporal domain. That is, the packet trace is transformed into the sequence of pulse signals in the temporal domain. The method 100 then proceeds to operation 106, where the pulse signals in the temporal domain are transformed into pulse signals in a frequency domain via, for example, a discrete Fourier transform ("DFT"). When the pulse signals in the temporal domain are transformed into pulse signals in a frequency domain, the method 100 proceeds to operation 108.

At operation 108, pattern recognition techniques along with empirical data about the TCP flow clock may be utilized to detect peaks (i.e., spikes) within relevant frequency bands in the pulse signals in the frequency domain. The method 100 then proceeds to operation 110, where a fundamental frequency is determined based on the detected peaks. As used herein, the fundamental frequency refers to the lowest frequency in a harmonic series. According to embodiments, the fundamental frequency represents the TCP flow clock. The method 100 then proceeds to operation 112, where the fundamental frequency is returned as the TCP flow clock.

Figure 2:
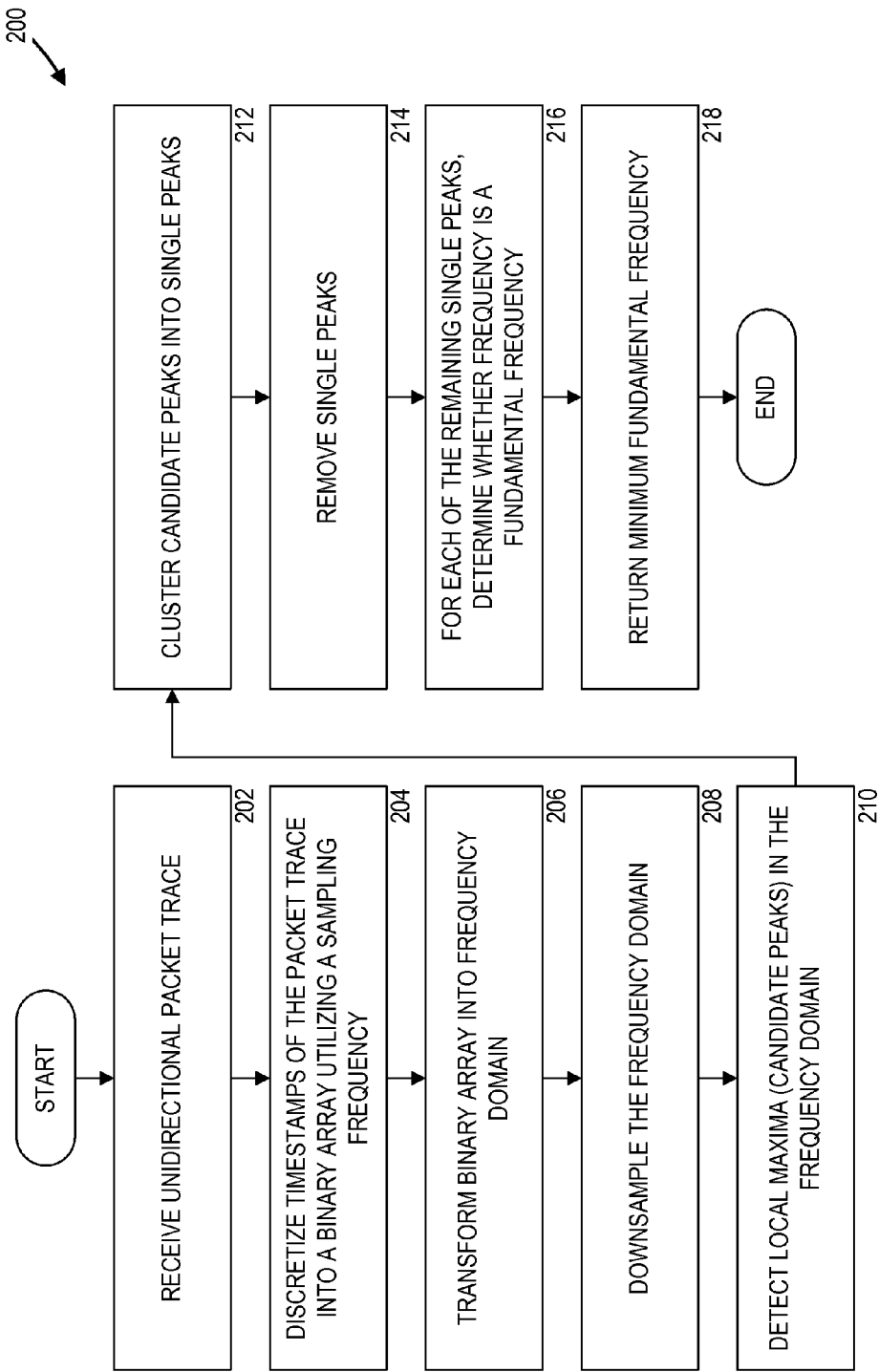
FIG. 2 is a flow diagram illustrating another exemplary method for extracting a TCP flow clock, in accordance with some embodiments.

FIG. 2 is a flow diagram illustrating an exemplary method 200 for extracting a TCP flow clock, where it exists, according to some embodiments. The method 200 begins at operation 202, where a unidirectional packet trace, T, is received. The operation 202 generally corresponds to the operation 102. The method 200 then proceeds to operation 204, where given the unidirectional packet trace, T, timestamps of T are discretized into a binary array, B, utilizing a sampling frequency. In particular, the input packet trace contains timestamps of packets in continuous values, which may be difficult for computers to process. As such, discretization is performed whereby non-continuous slots are created, and each real-valued timestamp is placed in the closest slot. In one embodiment, the sampling frequency is at or about 500 Hz, although other sampling frequencies may be similarly utilized. The timestamps of T refer to the time each packet is received by the receiving entity. The binary array, B, may be defined such that, for a given index, i, B(i)=1 if and only if there is at least one packet that arrived between times 2i and 2i+2 milliseconds. In this example, B(i) denotes the ith slot. The operation 204 generally corresponds to the operation 104. When the timestamps of T are discretized into the binary array, B, the method 200 proceeds to operation 206.

At operation 206, DFT is utilized to transform B into a frequency domain, F, through the following computation: $F=DFT(B, 2^{\lceil log_2 B.len \rceil})$, where B.len refers to the length (i.e., the number of elements) in the binary array B. The method 200 then proceeds to operation 208, where the frequency domain, F, is downsampled. In one embodiment, the frequency domain, F, is downsampled to 1,000 points (i.e., the number of elements in the array, F) such that the resolution of each point is 0.25 Hz. The value of 0.25 Hz is derived from the length of F, which is 1000, and an exemplary sampling frequency of 500 Hz (i.e., 500/2/1000=0.25). The length of F may be empirically chosen and may not be sensitive to the results. The operations 206 and 208 generally correspond to the operation 106. When the frequency domain, F, is downsampled, the method 200 proceeds to operation 210.

At operation 210, local maxima (i.e., candidate peaks) are detected in the frequency domain, F, by sliding a window of size, w, and sensitivity, s, along the frequency spectrum. As used herein, a "window" denotes a fixed number (i.e., the window size) of consecutive points in the frequency spectrum. A "sliding a window" denotes enumerating all window positions. In an example, the length of the frequency spectrum is n, where n=1000 in an exemplary implementation, and the window size is w. Then by sliding a window, all n−w+1 different windows are enumerated as follows:

Window 1: (1, . . . ,w)
Window 2: (2, . . . ,w+1)
. . .
Window n−w+1: (n−w+1, . . . ,n)

The "sensitivity" determines the threshold at which a peak is chosen.

Those points along the frequency spectrum that have an amplitude greater than a first amplitude threshold are marked as candidate peaks. In one embodiment, the first amplitude threshold is $\mu+s\sigma$, where $\mu$ represents the mean and $\sigma$ represents the standard deviation of the points within the window. A larger value of s may increase the difficulty in which a peak is detected, but the confidence of detected peaks may be high. The value of s may be empirically chosen.

In one embodiment, different values of w and s can be utilized to discover both narrow and wide candidate peaks. In some implementations, peaks having a width of zero may be desired. However, noise (e.g., variation of application delay and variation of network latency) may widen the peak. That is, a wide peak may indicate more noises than a narrow peak. Exemplary (w, s) pairs include (4,8), (8,16), and (16,32). The method 200 then proceeds to operation 212, where consecutive candidate peaks are clustered into a single peak. In one embodiment, several peaks are combined into a single peak using weighted averaging. In an example, there are k consecutive peaks (p1, a1), ..., (pk,ak) where pi is the frequency of the ith peak and ai is the amplitude of the ith peak. Then the merged peak has a frequency (p1*a1+ ... +pk*ak)/(a1+ ... +ak) and an amplitude max {a1, ..., ak}.

In one embodiment, consecutive peaks are those candidate peaks having a distance apart of less than five points. The method 200 then proceeds to operation 214, where the single peaks having an amplitude of less than a second amplitude threshold are removed. In one embodiment, the second amplitude threshold is $\mu_0+3\sigma_0$, where $\mu_0$ represents the mean and $\sigma_0$ represents the standard deviation for all 1,000 points. The operations 210, 212, and 214 generally correspond to the operation 108. When the peaks are removed, the method 200 proceeds to operation 216.

At operation 216, for each single peak with a frequency, f, a determination is made as to whether f is a fundamental frequency. In one embodiment, the following computation is performed in order to determine whether f is a fundamental frequency: for k=2,3,4, f is a fundamental frequency if there exists a peak with a frequency f'ϵ(kf−δ,kf+δ) where a tolerance parameter, δ, is set to three, and f' denotes a candidate peak. If such f' exists for all k=2,3,4, then a fundamental frequency has been found. The tolerance parameter, δ, addresses the possibility that the positions of peaks may not be entirely accurate due to discretization and downsampling. For example, the true peak may be at 25.05 Hz, although the peak is observed at 25 Hz. The operation 216 generally corresponds to the operation 110. The method 200 then proceeds to operation 218, where a minimum fundamental frequency is returned, if found. The minimum fundamental frequency represents the TCP flow clock. The minimum fundamental frequency may refer to the fundamental frequency having the lowest frequency value. The operation 218 generally corresponds to the operation 112.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 3:
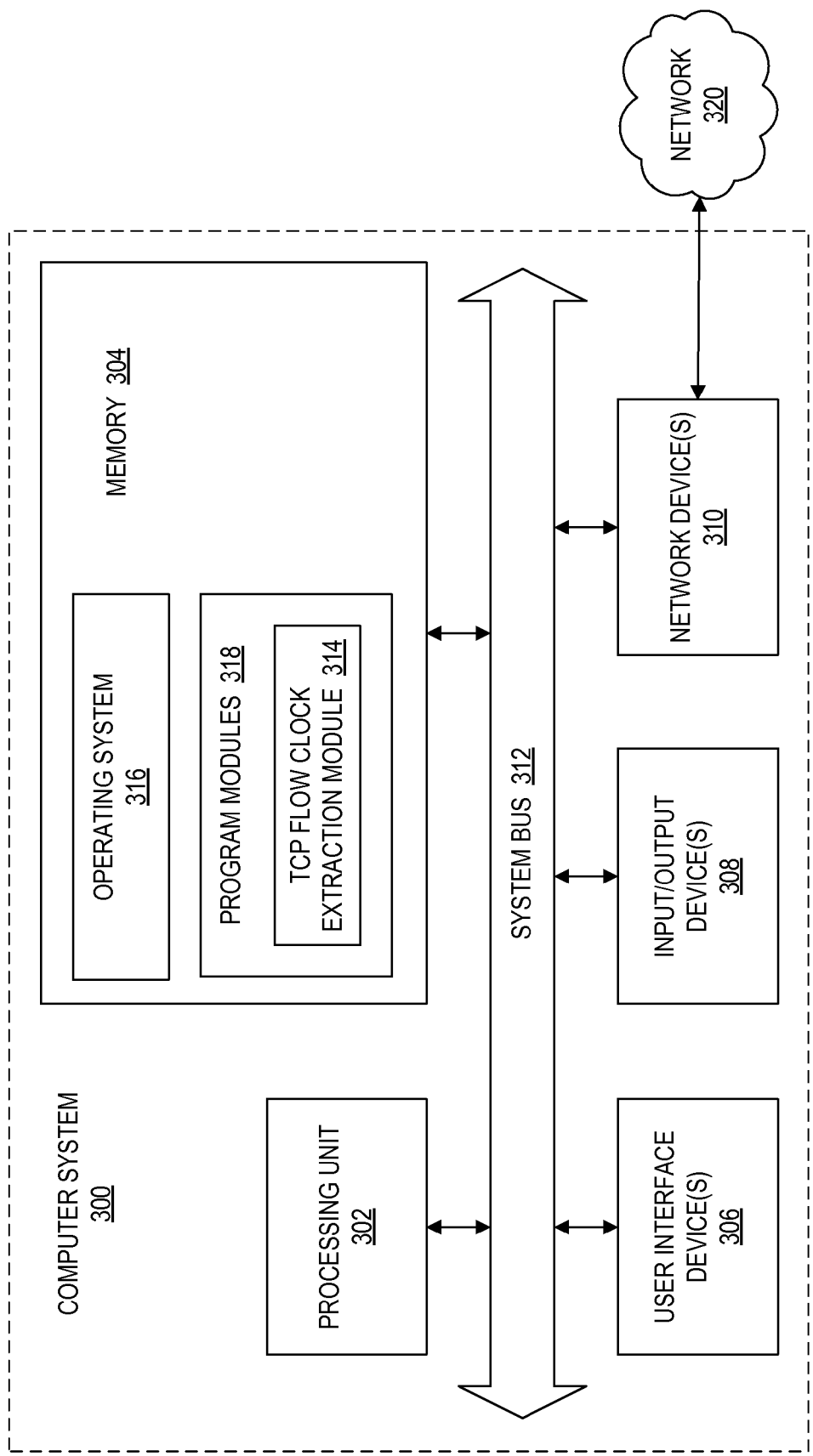
FIG. 3 is a block diagram illustrating an exemplary computer system configured to extract a TCP flow flock, in accordance with some embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to extract a TCP flow clock, in accordance with embodiments. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 318 include a TCP flow clock extraction module 314. In some embodiments, the TCP flow clock extraction module 314 is embodied in computer-readable media containing instructions that, when executed by the processing unit 302, performs the methods 100, 200 for extracting the TCP flow clock, as described in greater detail above with respect to FIGS. 1 and 2. According to embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via the network 320. Examples of the network devices 310 may include, but are not limited to, a modem, a radio frequency ("RF") or infrared ("IR") transceiver, a telephonic interface, a bridge, a router, or a network card. The network 320 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 320 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for extracting a transmission control protocol flow clock, the method comprising:
   receiving, through a computer, a packet trace;
   transforming the packet trace into a sequence of pulse signals in a temporal domain;
   transforming the sequence of pulse signals in the temporal domain into a sequence of pulse signals in a frequency domain;
   detecting peaks within relevant frequency bands in the sequence of pulse signals in the frequency domain;
   identifying a fundamental frequency within the peaks; and
   returning the fundamental frequency as the transmission control protocol flow clock.

2. The method of claim 1, wherein the packet trace comprises a unidirectional packet trace.

3. The method of claim 2, wherein transforming the packet trace into a sequence of pulse signals in a temporal domain comprises discretizing timestamps of the packet trace into a binary array utilizing a given sampling frequency.

4. The method of claim 3, wherein transforming the sequence of pulse signals in a temporal domain into a sequence of pulse signals in a frequency domain comprises:
   transforming the sequence of pulse signals in a temporal domain into the sequence of pulse signals in a frequency domain utilizing a discrete Fourier transform; and
   downsampling the pulse signals in the frequency domain.

5. The method of claim 4, wherein detecting peaks within relevant frequency bands in the sequence of pulse signals in the frequency domain comprises:
   detecting local maxima within the pulse signals in the frequency domain by sliding a window of a given size and a given sensitivity along a frequency spectrum of the pulse signals in the frequency domain;
   identifying candidate peaks as the local maxima having an amplitude larger than a first amplitude threshold;
   clustering the candidate peaks that are consecutive into single peaks; and
   detecting the peaks by removing the single peaks having an amplitude less than a second amplitude threshold.

6. The method of claim 5, wherein identifying a fundamental frequency within the peaks comprises identifying fundamental frequencies corresponding to a fundamental frequency criteria, the fundamental frequency criteria based in part on a tolerance parameter.

7. The method of claim 6, wherein returning the fundamental frequency as the transmission control protocol flow clock comprises returning a minimum fundamental frequency from the identified fundamental frequencies as the transmission control protocol flow clock.

8. A system for extracting a transmission control protocol flow clock, comprising:
   a memory for storing a program containing code for extracting the transmission control protocol flow clock; and
   a processor being responsive to computer-executable instructions contained in the program that, when executed by the processor, cause the processor to perform operations comprising
   receiving a packet trace,
   transforming the packet trace into a sequence of pulse signals in a temporal domain,
   transforming the sequence of pulse signals in the temporal domain into a sequence of pulse signals in a frequency domain,
   detecting peaks within relevant frequency bands in the sequence of pulse signals in the frequency domain,
   identifying a fundamental frequency within the peaks, and
   returning the fundamental frequency as the transmission control protocol flow clock.

9. The system of claim 8, wherein the packet trace comprises a unidirectional packet trace.

10. The system of claim 9, wherein transforming the packet trace into a sequence of pulse signals in a temporal domain comprises discretizing timestamps of the packet trace into a binary array utilizing a given sampling frequency.

11. The system of claim 10, wherein transforming the sequence of pulse signals in a temporal domain into a sequence of pulse signals in a frequency domain comprises:
- transforming the sequence of pulse signals in a temporal domain into the sequence of pulse signals in a frequency domain utilizing a discrete Fourier transform; and
- downsampling the pulse signals in the frequency domain.

12. The system of claim 11, wherein detecting peaks within relevant frequency bands in the sequence of pulse signals in the frequency domain comprises:
- detecting local maxima within the pulse signals in the frequency domain by sliding a window of a given size and a given sensitivity along a frequency spectrum of the pulse signals in the frequency domain;
- identifying candidate peaks as the local maxima having an amplitude larger than a first amplitude threshold;
- clustering the candidate peaks that are consecutive into single peaks; and
- detecting the peaks by removing the single peaks having an amplitude less than a second amplitude threshold.

13. The system of claim 12, wherein identifying a fundamental frequency within the peaks comprises identifying fundamental frequencies corresponding to a fundamental frequency criteria, the fundamental frequency criteria based in part on a tolerance parameter; and
- wherein returning the fundamental frequency as the transmission control protocol flow clock comprises returning a minimum fundamental frequency from the identified fundamental frequencies as the transmission control protocol flow clock.

14. A non-transitory computer-readable medium having instructions stored thereon for extracting a transmission control protocol flow clock that, the instructions, when executed by a processor, cause the processor to perform operations comprising:
- receiving, through a computer comprising the processor, a packet trace;
- transforming the packet trace into a sequence of pulse signals in a temporal domain;
- transforming the sequence of pulse signals in the temporal domain into a sequence of pulse signals in a frequency domain;
- detecting peaks within relevant frequency bands in the sequence of pulse signals in the frequency domain;
- identifying a fundamental frequency within the peaks; and
- returning the fundamental frequency as the transmission control protocol flow clock.

15. The non-transitory computer-readable medium of claim 14, wherein the packet trace comprises a unidirectional packet trace.

16. The non-transitory computer-readable medium of claim 15, wherein transforming the packet trace into a sequence of pulse signals in a temporal domain comprises discretizing timestamps of the packet trace into a binary array utilizing a given sampling frequency.

17. The non-transitory computer-readable medium of claim 16, wherein transforming the sequence of pulse signals in a temporal domain into a sequence of pulse signals in a frequency domain comprises:
- transforming the sequence of pulse signals in a temporal domain into the sequence of pulse signals in a frequency domain utilizing a discrete Fourier transform; and
- downsampling the pulse signals in the frequency domain.

18. The non-transitory computer-readable medium of claim 17, wherein detecting peaks within relevant frequency bands in the sequence of pulse signals in the frequency domain comprises:
- detecting local maxima within the pulse signals in the frequency domain by sliding a window of a given size and a given sensitivity along a frequency spectrum of the pulse signals in the frequency domain;
- identifying candidate peaks as the local maxima having an amplitude larger than a first amplitude threshold;
- clustering the candidate peaks that are consecutive into single peaks; and
- detecting the peaks by removing the single peaks having an amplitude less than a second amplitude threshold.

19. The non-transitory computer-readable medium of claim 18, wherein identifying a fundamental frequency within the peaks comprises identifying fundamental frequencies corresponding to a fundamental frequency criteria, the fundamental frequency criteria based in part on a tolerance parameter.

20. The non-transitory computer-readable medium of claim 19, wherein returning the fundamental frequency as the transmission control protocol flow clock comprises returning a minimum fundamental frequency from the identified fundamental frequencies as the transmission control protocol flow clock.

* * * * *